United States Patent [19]

Yasunaga

[11] Patent Number: 5,386,114
[45] Date of Patent: Jan. 31, 1995

[54] DETECTOR FOR ACTIVITY DIRECTION OF MAGMA

[75] Inventor: Soichiro Yasunaga, Tokyo, Japan

[73] Assignee: Riken Denshi Co., Ltd., Japan

[21] Appl. No.: 169,612

[22] Filed: Dec. 17, 1993

[30] Foreign Application Priority Data

Dec. 25, 1992 [JP] Japan .................. 4-361930

[51] Int. Cl.⁶ .............. G01J 5/00; G01T 3/00
[52] U.S. Cl. .................. 250/253; 250/256; 250/390.01; 250/390.1
[58] Field of Search ........... 250/253, 256, 390.01, 250/390.1, 390.12, 392; 364/421; 324/323, 344

[56] References Cited

U.S. PATENT DOCUMENTS

| | | |
|---|---|---|
| 3,612,877 | 10/1971 | Hopkinson . |
| 4,005,290 | 1/1977 | Allen . |
| 4,021,666 | 5/1977 | Allen . |
| 4,228,350 | 10/1980 | Paap et al. ............ 250/267 |
| 4,628,299 | 12/1986 | Tate et al. ............ 324/323 X |
| 4,814,610 | 3/1989 | Attali et al. . |
| 4,837,582 | 6/1989 | Takahashi et al. ..... 324/344 X |
| 4,884,030 | 11/1989 | Naville et al. . |
| 4,904,943 | 2/1990 | Takahashi . |
| 4,961,143 | 10/1990 | Takahashi et al. . |
| 5,241,175 | 8/1993 | Yasunaga ............ 250/253 |

FOREIGN PATENT DOCUMENTS

| | | | |
|---|---|---|---|
| 3901125 | 6/1989 | Germany ............ 364/421 |
| 57-200882 | 12/1982 | Japan ............ 250/390.01 |
| 1-242985 | 9/1989 | Japan ............ 324/323 |
| 2183038 | 5/1987 | United Kingdom . |
| 507844 | 4/1976 | U.S.S.R. ............ 250/253 |
| 1583906 | 8/1990 | U.S.S.R. ............ 250/253 |

OTHER PUBLICATIONS

Melvin et al., "An Automated Radon-Thoron Monitor for Earthquake Prediction Research", 2107 Nuclear Instruments & Methods, vol. 153 No. 1(1978.07) pp. 239-251.

Kuckertz et al., "Monitoring and Detection of Plutonium Movement in Storage Vaults", 8100 IEEE Transactions on Nuclear Science, vol. NS-29 (1982) Feb., No. 1, New York, USA pp. 847-851.

Haines et al, "Measuring Planetary Neutron Albedo Fluxes by Remote γ-Ray Sensing", 2107A Nuclear Instruments & Methods in Physics Research. Section A 266(1984) Oct., No. 2/3, Amsterdam, Netherlands pp. 517-523.

Ramola et al., "The Use of Radon as an Earthquake Precursor", Necl. Geophys. vol. 4, No. 2, pp. 275-287, 1990 Int. J. Radiat. Appl. Instrum. Part E.

*Primary Examiner*—Constantine Hannaher
*Assistant Examiner*—Edward J. Glick
*Attorney, Agent, or Firm*—Harris Beach & Wilcox

[57] ABSTRACT

Apparatus for helping predict the occurrence of an earthquake or a volcanic eruption by detecting and recording the direction of a neutron flow generated in the earth's magma and the intensity of the neutron activity.

8 Claims, 3 Drawing Sheets

DETECTOR FOR ACTIVITY DIRECTION OF MAGMA

BACKGROUND OF THE INVENTION

This invention relates to a device to be used for detection of the intensity and the direction of flow of the earth's magma activity to aid in the prediction of an earthquake or a volcanic eruption.

It has been known, according to Japanese Appl'n No. 277118/91, (U.S. Pat. No. 5,124,175) that the number of neutrons present in the earth's magma region will increase with an increase in the magma's activity. Moreover, the Research Institute of Predictive Science of Disasters of the Science and Technology Agency reported on Dec. 9th, 1992 about the Unzen Fugendake region that "... the results on measuring temperatures in a wide range over the Fugendake conducted on Nov. 15th, 1992 by using an infrared photographic device indicates a remarkable decrease (in temperature) when compared to previous results measured on May 1992, suggesting that a volcanic activity was lessened ... "

The neutron level of the earth's magma was continuously recorded at Fukae-cho, using a neutron detecting device located within a 3 km radius of Fugendake. The readings were taken over a four month period from Aug. 1st until Dec. 15th, 1992. The peak level of detected neutron radiation was recorded during early August and was compared to similar readings after October when the volcanic activity had lessened. The compared neutron levels for October and August were significantly different; the ratio being about 1,000 to 1. During the period from Aug. 4th to Aug. 27th 1992, it was found that the average count level was more than 10,000 counts/hour and the maximum count recorded was 45,000 counts/hour. After Sep. 27th 1992 the average level recorded was less than 100 counts/hour and the recorded minimum level was only 40 counts/hour. This reduction in the level of detected neutrons continued up to Dec. 15th, 1992.

According to accounts given by residents near the Fugendake region, there occurred falling ash, eruption of the lava, and rumbling of the earth during the peak period of volcanic activities and this coincided with an increase in the increased amount of detected neutrons. It can be clearly stated, therefore, that the detected amount of neutrons is closely related to volcanic activities.

Application No. 277118/91 discloses a method of predicting earthquakes or volcanic eruptions by continuously monitoring the level of background neutrons relating to the earth's magma. As discussed in this application, the magma's activity can be determined by detecting the neutron level, and based on this information, a prediction made regarding the occurrence of an earthquake or volcanic eruption. However, it was impossible to determine from which direction the flow is coming from. As will be explained in greater detail below, through use of the present invention, both the intensity and direction of movement of the earth's magma can be determined, thus greatly enhancing the ability to predict the onset of an earthquake or a volcanic eruption as well as the region of intense activity.

OBJECT AND SUMMARY OF THE INVENTION

It is therefore an object of the present invention to provide apparatus by which an accurate prediction of an earthquake or a volcanic eruption can be made as well as the direction of movement of the activity so that the region of highest intensity can be determined.

Neutrons have a very broad energy spectrum ranging from 0.025 eV to 100 MeV. The penetration power of the neutron is very strong and neutrons generated in the earth's magma will easily penetrate thick rock layers and the like and be released to the atmosphere in the nature of background neutrons. Capturing and analyzing these high energy background neutrons, however, has proven to be difficult. It is known that background neutrons are readily absorbed by hydrogen whereupon they lose their original energy levels and are transformed into thermal neutrons whose energy levels diminish very rapidly. It is very difficult to produce a standard source of neutron having monolithic energy level, and also difficult to know the intensity of neutron which have been caught in $^3$He senser.

As will be explained in greater detail below, the present invention utilizes a cadmium shield in a special manner to detect not only the amount of neutron in a given region, but also the direction of neutron flow. It is well known that an object can be completely shielded from thermal neutron by a cadmium shield having a thickness of about 0.5 mm or greater. In the practice of the present invention, a neutron sensor is filled with an isotope of helium ($^3$He) under pressure and is loaded with one or more detection electrodes so that it reacts with thermal neutrons having energy levels of about 0.025 eV. The sensor is surrounded by a cadmium shield made of 0.5 mm or more thick plate. The shield has a narrow window which permits neutrons to pass through the shield and detected by the sensor. The shield, and thus the window, are rotated about the sensor so that both the intensity and the direction of flow of the neutrons can be detected.

The cadmium shield serves to prevent the neutron that lower than 0.5 eV of energy level. A resin material containing hydrogen as a major constituent may also be coated upon the shield to reduce the level of neutrons having even higher energy levels whereby only thermal neutrons reach the sensor.

BRIEF DESCRIPTION OF THE DRAWINGS

For a better understanding of these and other objects of the present invention, reference will be made to the following detailed description of the invention which is to be read in conjunction with the accompanying drawings wherein:

FIG. 5 illustrates a cadmium shield as illustrated in FIG. 1 that is coated with an energy reducing material, wherein:

1 is a neutron source probe,
2 is a window in a cadmium shield cover,
3 is a synchronous motor, 4 is an encoder,
5 is a neutron sensor,
6 and 7 are gears
8 is the cadmium shield cover,
9 is an amplifier case,
10 is an amplifier,
11 and 12 are part of the sensor housing,
13 and 14 are flanges,
15 is a thermal recorder,
16 is an energy reducing material
17 is a shaft.

DETAILED DESCRIPTION OF A PREFERRED EMBODIMENT

Figure 3:
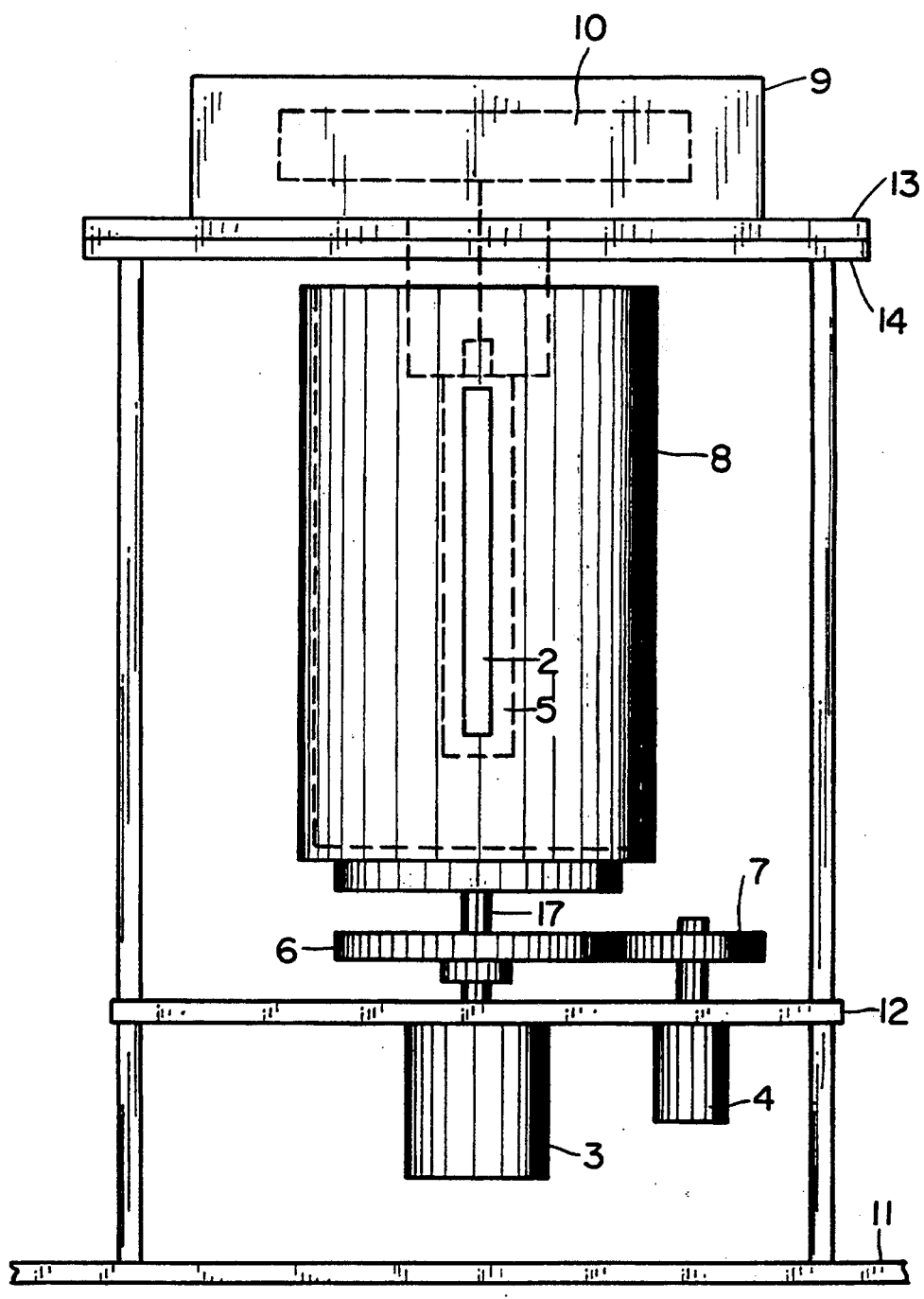
FIG. 3 is a side elevation showing the construction of apparatus embodying the present invention.

Referring initially to FIG. 3 there is shown a housing that includes a base 11, a platform 12 and upper mating flanges 13 and 14. An amplifier 10 depends from amplifier case 9 so that it passes downwardly into the main body of the housing. A neutron sensor 5 is axially mounted in the housing immediately beneath the amplifier. A synchronous motor 3 and an encoder 4 are mounted upon the underside of the platform 12. The motor is connected by a shaft 17 to a rotatably mounted cadmium shield which surrounds the neutron sensor so that the shield turns at the motor speed. The motor is further connected to the encoder via gears 6 and 7.

The shield is equipped by an elongated vertically disposed window 2 through which thermal neutrons can pass. As can be seen, the shield, and thus the window, are rotated through 360° by the motor. The cadmium shield prevents thermal neutrons from reaching the sensor except through the window. The neutron sensor is arranged to generate a pulse each time it is irradiated by a thermal neutron. The pulse is converted to a TTL output signal or an equivalent signal and then amplified by amplifier 10. As can be seen, more thermal neutrons will be able to reach the sensor through the window when the window is facing in the direction of neutron flow. By plotting the output signal in regard to the window position, the direction of flow can be determined as well as the amount or intensity of the thermal neutrons in the flow.

Figure 4:
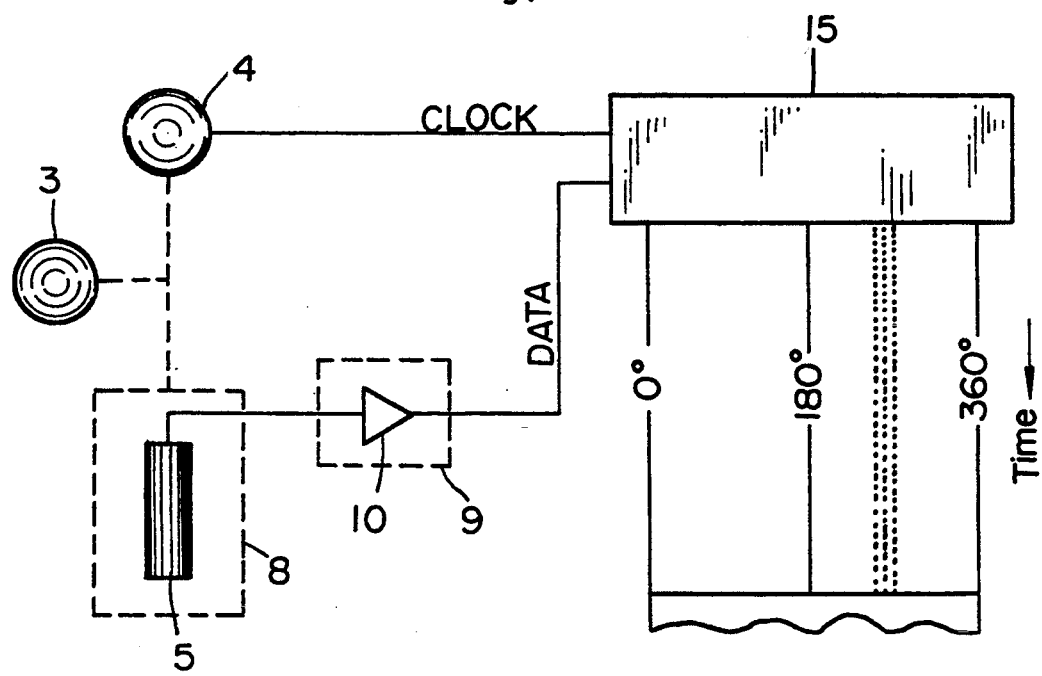
FIG. 4 is a block diagram showing electrical circuitry associated with the apparatus of the present invention.

FIG. 4 illustrates circuitry for detecting the direction of the neutron flow as well as the number of output pulses generated by the amplifier which is indicative of the intensity of the neutron stream. As noted above, the encoder is connected to the rotating shield by means of gears 6 and 7. The encoder generates a stream of pulses during each revolution of the shield. The pulses are used to plot the window position and also serves as clock pulses for thermal recorder 15. The angle of rotation of the encoder is calibrated so that the angular position of the window corresponds to the position of a stylus (not shown) found in the thermal recorder.

The output signals from the sensor 5 are applied to a data terminal on the thermal recorder through the amplifier 10. When a sensor output signal is generated at a certain window position, it is marked at the appropriate angle on a chart by the stylus. The encoder output will typically be analoged through a counter and a D/A converter and used to drive the thermal recorder through means of pulse motor. The recording stylus moves over the recording strip chart with respect to the window position and is dropped to mark the strip each time a sensor output pulse is generated. As best seen in the example shown in FIG. 4, a continuous stream of marks are recorded midway between the 180° and 360° window positions thus indicating the neutron flow is coming from about 270°. By counting the marks, the amount of neutrons reaching the sensor which are indicative of the flow intensity can also be determined.

Figure 1:
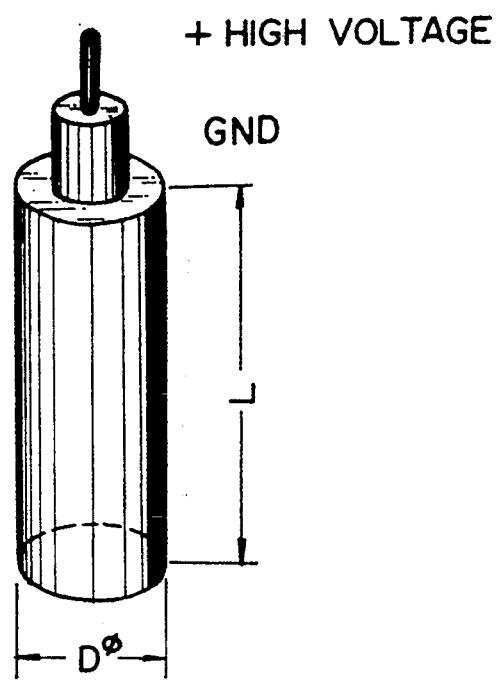
FIG. 1 is a perspective view of a thermal neutron sensor used in the practice of the present invention.
Figure 2A:
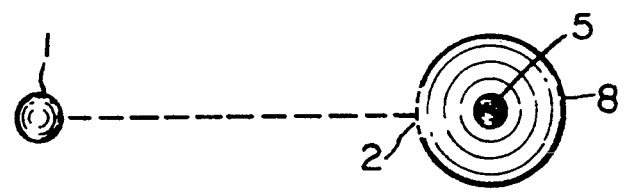
FIGS. 2(A) and 2(B) illustrates the sensor mounted inside a cadmium shield containing a window, the sensor being positioned adjacent to a neutron source and the window in the shield being shown in a first position in one view facing the neutron source and in a second position in the second view facing away from the source.
Figure 2B:
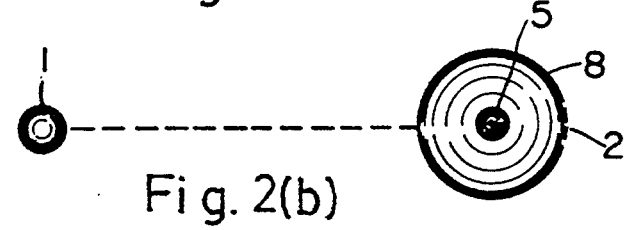

Turning now to FIGS. 1 and 2, there is shown a sensor 5 used to test the apparatus of the present invention. A sensor 5, as shown in FIG. 1, has a predetermined length and diameter. The sensor is axially aligned within a cylindrical shield 8 of the type described in regard to FIG. 3. The sensor contains a high voltage electrode mounted in a grounding sleeve and is filled with an isotope of helium so that it will react with thermal neutrons having energy levels of about 0.025 eV. A thermal neutron source 1 is positioned some distance from the sensor and a 0.5 mm thick cadmium shield 8 is rotated about the sensor, as described above.

Circuitry as shown in FIG. 4 is used to record the number of neutrons from the source 1 striking the sensor. The shield contains a window 2 that alternately faces toward and away from the neutron source as the shield is rotated as shown in FIG. 2. The detected neutron levels are differentiated between window locations with the difference being about 50% less when the probe is facing away from the source than when facing the probe. This clearly indicates the direction of neutron flow.

Figure 5:
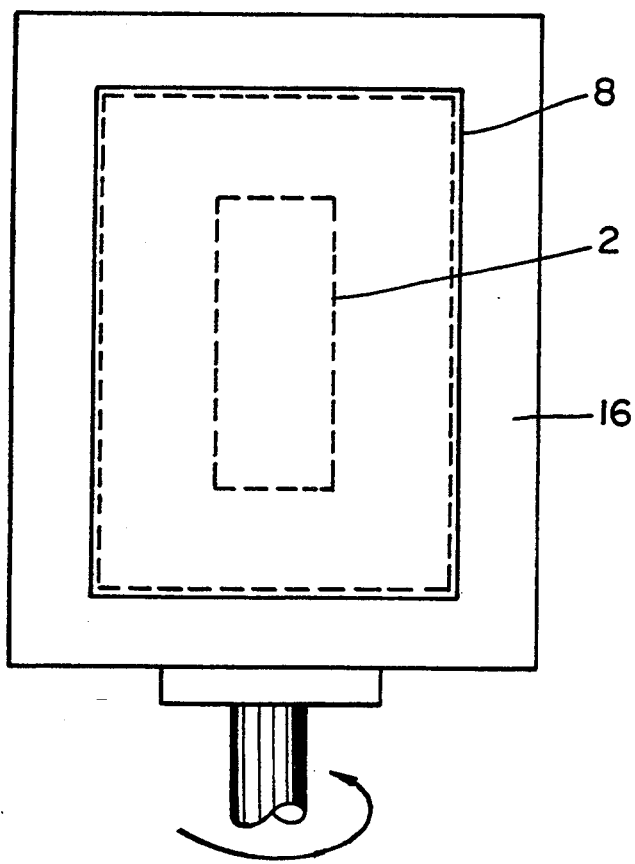

Apparatus for detecting very high energy neutrons is shown in FIG. 5. The apparatus is similar to that shown in FIG. 3 and includes a cylindrical shaped cadmium shield 8 having a window 2 formed therein. The shield is further covered with an energy reducing material of desired thickness. The coating material preferably is a resin having hydrogen as a major constituent. Polyethylene represents one such material suitable for use in this embodiment.

While this invention has been described in detail with reference to preferred embodiment and structure disclosed herein, it should be understood that the invention is not limited to that precise embodiments; rather many modifications and variations would present themselves to those of skill in the art without departing from the scope and spirit of this invention, as defined in the appended claims.

What is claimed is:

1. Apparatus for detecting the activity of underground magma to help predict the occurrence of an earthquake or volcanic eruption that includes,
   a neutron sensor for providing an output signal when irradiated by a neutron generated in underground magma,
   a rotatable cadmium shield surrounding said sensor, said shield having a window for permitting neutrons to enter said shield and irradiate said sensor,
   drive means for rotating said shield through 360°,
   detecting means for plotting the angular position of said window and recording the occurrence of an output signal from said sensor in regard to said angular position of said cadmium shield whereby the intensity and the direction of flow of the underground magma activity are detected.

2. The apparatus of claim 1 wherein said cadmium shield further includes a coating formed of an energy absorbing material.

3. The apparatus of claim 2 wherein said energy absorbing material has hydrogen as a major constituent.

4. The apparatus of claim 3 wherein said energy absorbing material is polyethylene.

5. The apparatus of claim 1 that further includes an encoder means for coordinating the movement of the shield with a recording means in said detecting means.

6. The apparatus of claim 1 that further includes an amplifier means for amplifying the sensor output signal.

7. The apparatus of claim 1 wherein said cadmium shield is a cylinder and said sensor is coaxially aligned along the axis of said cylinder.

8. The apparatus of claim 7 wherein the window is a longitudinal window formed in said cylinder.

* * * * *